(12) United States Patent
Oh

(10) Patent No.: US 7,237,518 B2
(45) Date of Patent: Jul. 3, 2007

(54) OIL FILTER FOR CONTINUOUS VARIABLE VALVE TIMING APPARATUS IN ENGINE

(75) Inventor: Chung-Han Oh, Yongin-si (KR)

(73) Assignee: Hyundai Motor Company, Seocho-Ku, Seoul (KR)

( * ) Notice: Subject to any disclaimer, the term of this patent is extended or adjusted under 35 U.S.C. 154(b) by 13 days.

(21) Appl. No.: 11/203,442

(22) Filed: Aug. 12, 2005

(65) Prior Publication Data

US 2006/0032474 A1    Feb. 16, 2006

(30) Foreign Application Priority Data

Aug. 13, 2004    (KR) .................... 10-2004-0063800

(51) Int. Cl.
*F01M 1/06* (2006.01)
(52) U.S. Cl. ................ 123/90.33; 123/90.34; 123/196 A; 123/90.17; 210/432; 210/499
(58) Field of Classification Search ............ 123/90.33, 123/90.34
See application file for complete search history.

(56) References Cited

U.S. PATENT DOCUMENTS

| 2,006,405 | A | * | 7/1935 | Monroe ................ 210/108 |
| 6,076,492 | A | * | 6/2000 | Takahashi ............. 123/90.17 |
| 6,289,861 | B1 | * | 9/2001 | Suzuki ................. 123/90.17 |
| 6,823,825 | B1 | * | 11/2004 | Hwang et al. .......... 123/90.15 |

FOREIGN PATENT DOCUMENTS

JP    2000-073716    3/2000

* cited by examiner

*Primary Examiner*—Thomas Denion
*Assistant Examiner*—Kyle M. Riddle
(74) *Attorney, Agent, or Firm*—Morgan Lewis & Bockius LLP

(57) ABSTRACT

An oil supply passage of a cylinder head increases design freedom of cylinder heads. The oil filter variously sets the oil supplying position through which oil enters into an oil filter. This improves fuel consumption by simplifying the oil supply passage of the cylinder head, reduces power loss of an oil pump, and decreases the size and weight of the cylinder head.

1 Claim, 4 Drawing Sheets

OIL FILTER FOR CONTINUOUS VARIABLE VALVE TIMING APPARATUS IN ENGINE

CROSS-REFERENCE TO RELATED APPLICATIONS

The present application is based on, and claims priority from, Korean Application Serial Number 10-2004-0063800, filed on Aug. 13, 2004, the disclosure of which is hereby incorporated by reference herein in its entirety.

FIELD OF THE INVENTION

The present invention relates to an oil filter structure. More particularly, the oil filter is mounted in an engine for filtering the oil supplied to a Continuous Variable Valve Timing (CVVT) apparatus.

BACKGROUND OF THE INVENTION

A continuous variable valve timing (CVVT) apparatus is generally used in the automotive industry to continuously adjust the opening and closing time period of an intake valve and exhaust valve of an engine. The intake and exhaust valves operate in accordance with the driving state of the engine. CVVT valve devices improve the engine output, fuel consumption rate, and reducing toxic waste in exhaust gas.

The typical CVVT apparatus is composed of a mechanism that advances or delays the intake and exhaust camshafts in a cylinder head. The mechanism conventionally includes an actuator for advancing or delaying the camshaft in relation to a camshaft sprocket. The mechanism also includes an oil control valve for controlling the oil, which is provided to the actuator, by using the Electronic Control Unit (ECU). The oil provided to the oil control valve is cleaned prior to reaching the CVVT apparatus by being passed through an oil filter.

SUMMARY OF THE INVENTION

Embodiments of the present invention allow more design freedom for an oil supply passage of a cylinder head. The design freedom is obtained by variously setting the oil supplying position through which oil is delivered into an oil filter. This results in a reduction of the fuel consumption rate by simplifying the oil supply passage and minimizing the cylinder head in size and weight.

An oil filter for a continuous variable valve timing (CVVT) apparatus includes a mounting part coupled to an engine block to retain a mounted state of the oil filter to the engine block. The oil filter also includes an oil screen for filtering oil. An adaptor provides a space between the oil screen and mounting part. During use, the oil enters into a space perpendicularly to an axis that connects the oil screen and mounting part and is drawn to the oil screen.

BRIEF DESCRIPTION OF THE DRAWINGS

For a better understanding of the nature and objects of the present invention, reference should be made to the following detailed description with the accompanying drawings, in which.

DETAILED DESCRIPTION OF PREFERRED EMBODIMENTS

Figure 1:
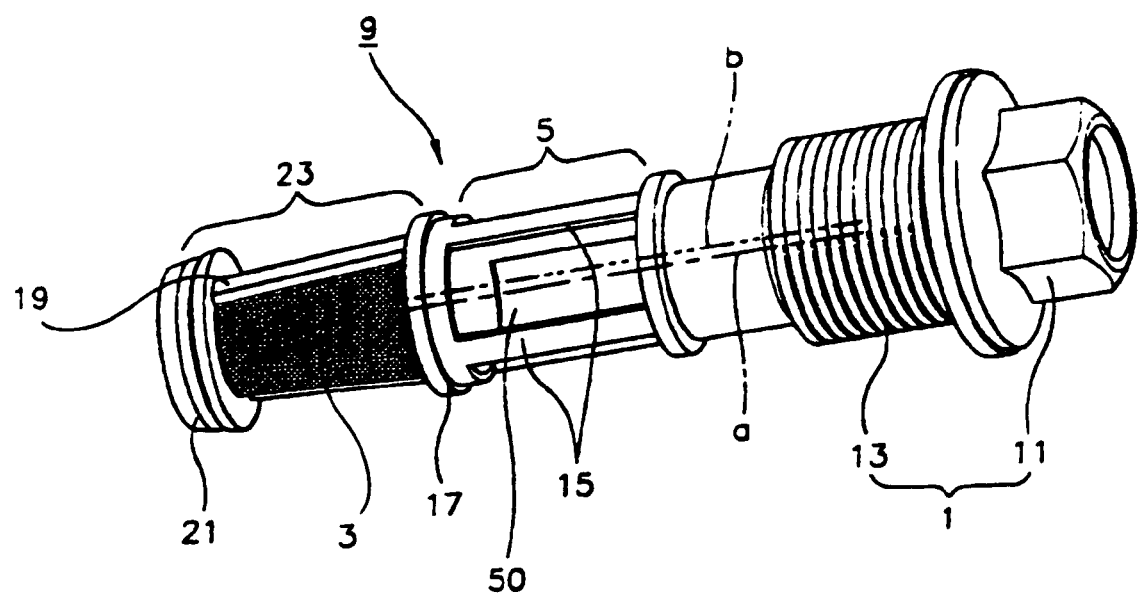
FIG. 1 is a perspective view of an oil filter for a continuous variable valve timing apparatus of an engine according to an embodiment of the present invention.

With reference to FIG. 1, a mounting part 1 couples to an engine block to retain the mounted state of an oil filter 9 to the engine block. An oil screen 3 is installed for filtering the oil. An adaptor 5 provides a space 50 between oil screen 3 and mounting part 1, and the oil is entered into the space 50 in a perpendicular direction to an axis (a) that connects oil screen 3 and mounting part 1 and is drawn to oil screen 3.

The position on the engine block in the present invention that the oil filter 9 mounts can be either a cylinder head 7 or cylinder block. That is, oil filter 9 may be installed at cylinder head 7 or mounted within a cylinder block of the engine. Oil filter 9, as shown in the accompanying figures is shown mounted at cylinder head 7.

As illustrated in the drawing, mounting part 1 has a bolt head 11 and thread 13. Bolt head 11 facilitates the attachment and detachment of oil filter 9, and a thread 13 is coupled to the cylinder head. Oil screen 3 is in a conelike cylinder shape having a center axis that is parallel to an axis (b) connecting mounting part 1 and adaptor 5, as shown in FIG. 1. The "conelike cylinder shape" substantially pertains to a cylinder and includes various similar forms thereof.

Adaptor 5 is formed with a plurality of connecting pillars 15 that are substantially parallel to axis (a) connecting mounting part 1 and oil screen 3. As oil enters into adaptor 5, it flows between connecting pillars 15 and into the interior of oil screen 3. Axis (a), connecting mounting part 1 and oil screen 3, and axis (b), connecting mounting part 1 and adaptor 5, are substantially virtual lines that penetrate the center of oil filter 9 in the longitudinal direction of the oil filter. The axes are provided for frame of reference and to facilitate discussion of the embodiment of the present invention. The axes (a) and (b) overlapped each other.

Oil screen 3 is firmly mounted via screen fixing part 23. Screen fixing part 23 is composed of a middle ring 17, a plurality of mounting pillars 19, and a front ring 21. Middle ring 17 is connected to connecting pillars 15, mounting pillars 19 extend from middle ring 17, and front ring 21 is connected to mounting pillars 19.

Oil can also flow through the inside of front ring 21 of screen fixing part 23. Thus, the oil supply passage to oil screen 3 can be formed to pass through adaptor 5 or the interior of front ring 21. Consequently, two selective oil supply passages are formed in oil filter 9.

Figure 2:
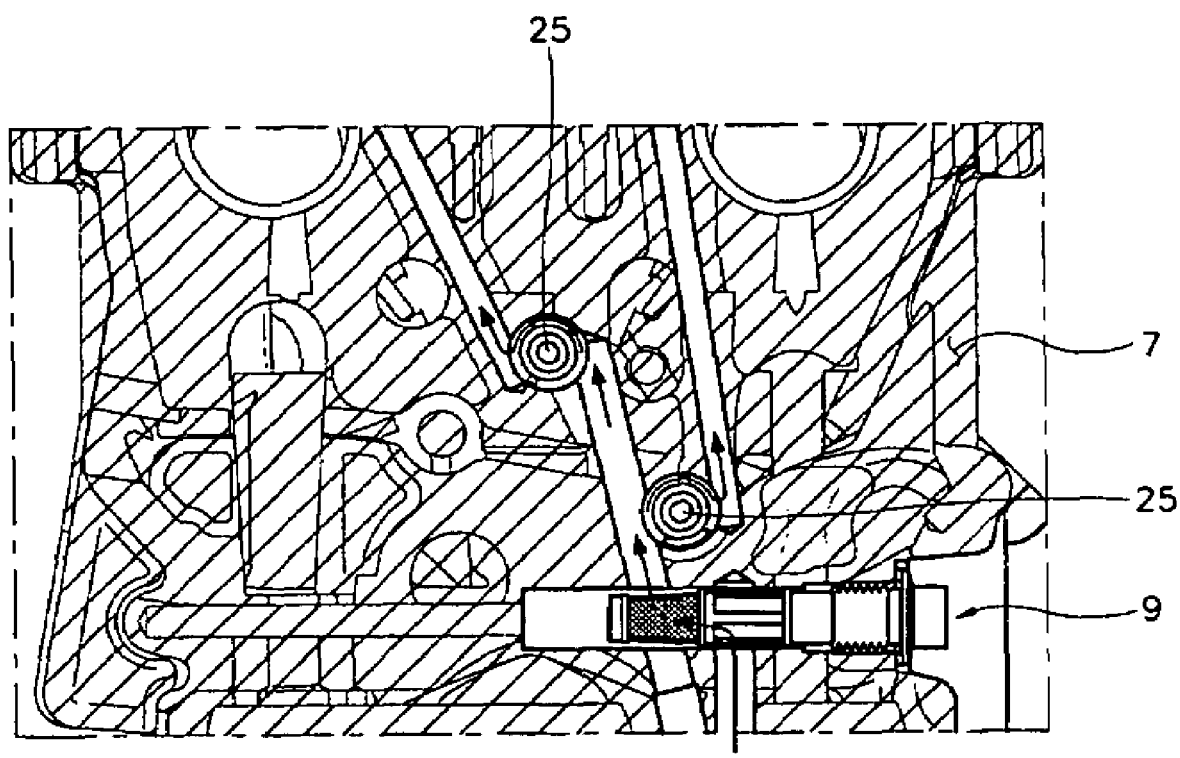
FIG. 2 illustrates a cylinder head of an engine where the oil filter of FIG. 1 is mounted.

Oil filter 9 of FIG. 1 is installed as adapted for mounting at a cylinder head 7, and a passage for providing the oil into oil filter 9 is configured to go directly into the interior of oil screen 3 through adaptor 5, as shown in FIG. 2.

Figure 3:
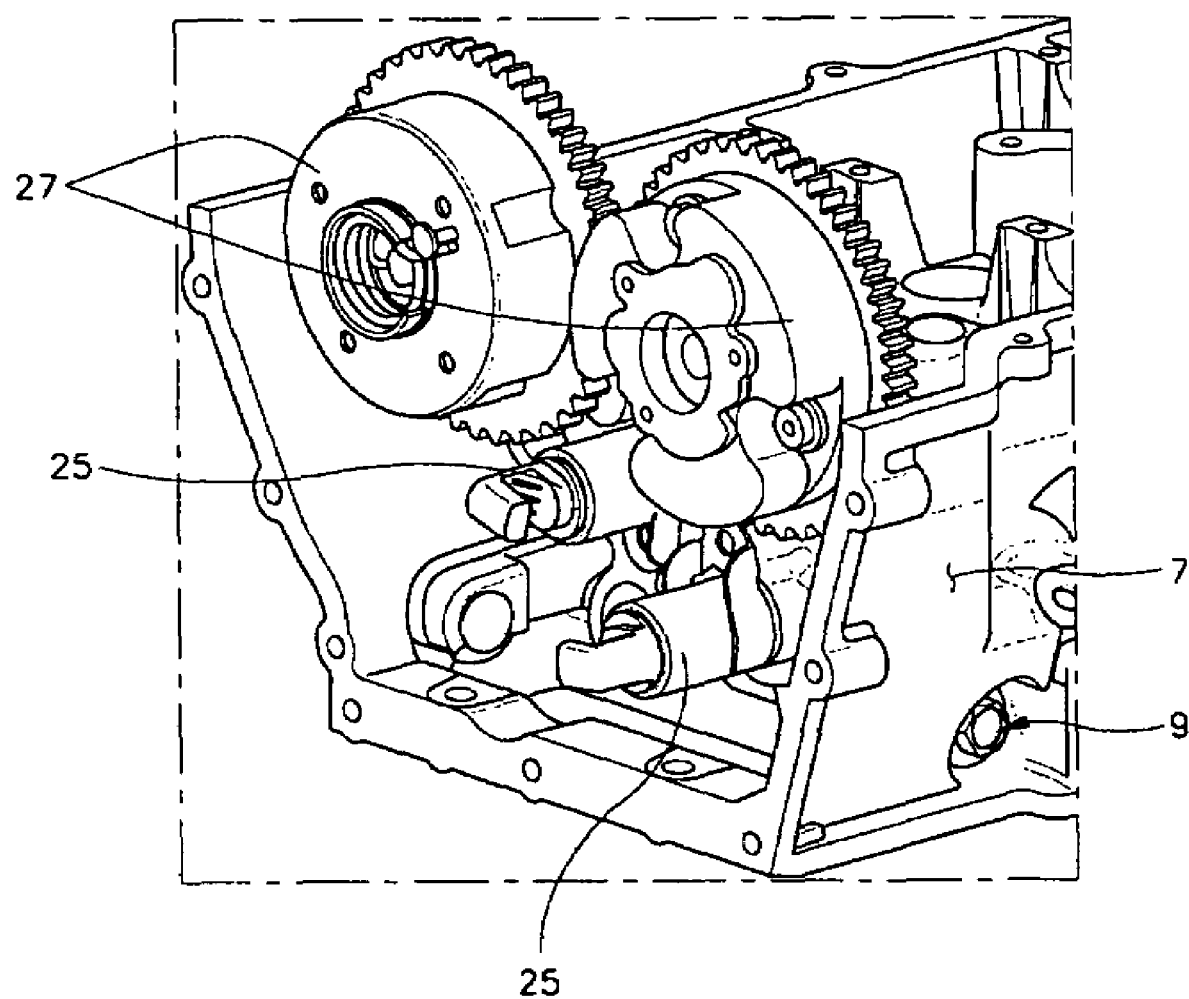
FIG. 3 is a cross-sectional view of the oil filter of FIG. 1 mounted at the cylinder head of FIG. 2.
Figure 4:
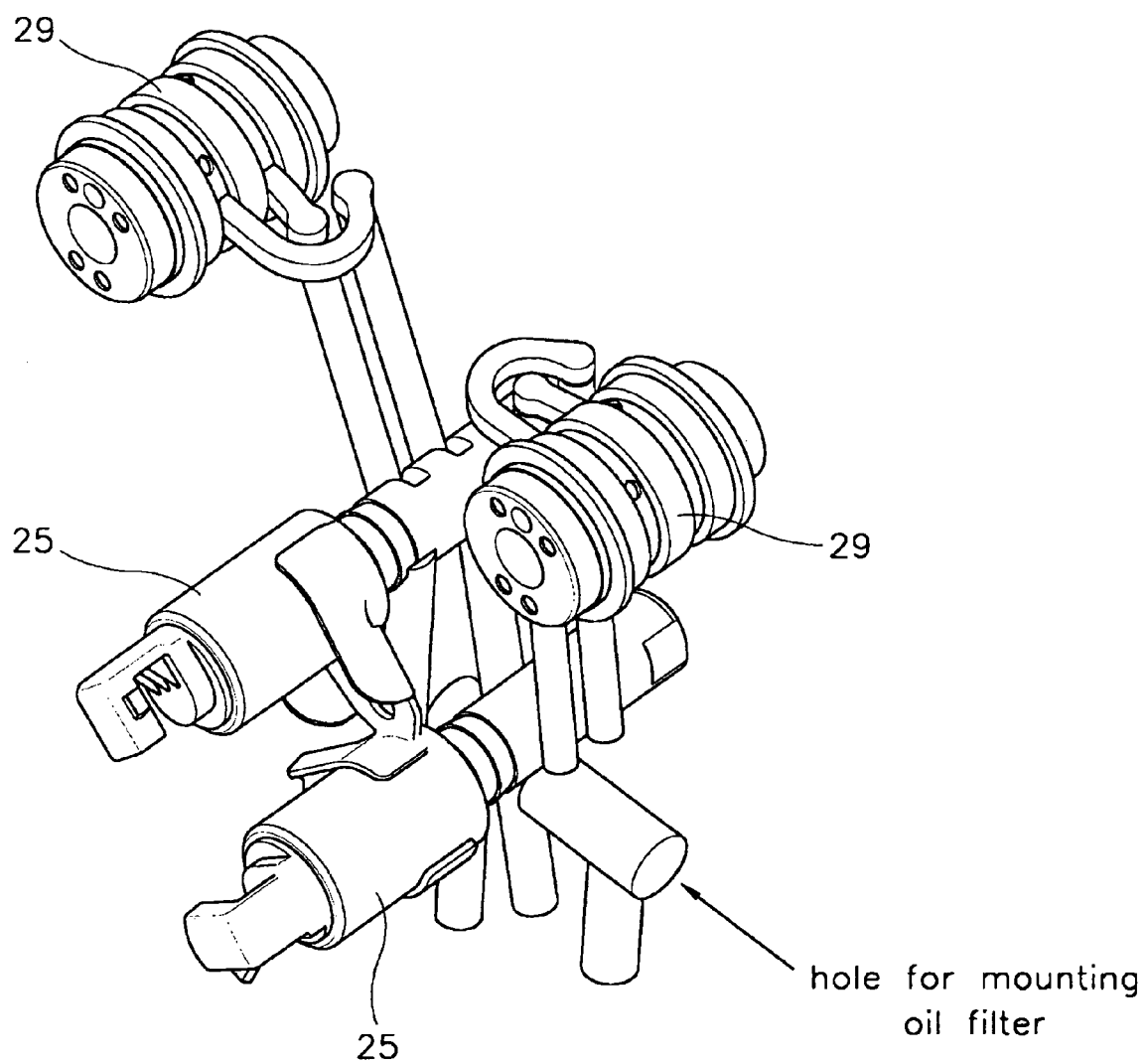
FIG. 4 illustrates an oil supply passage for a continuous variable valve timing apparatus according to an embodiment of the present invention.

Referring now to FIGS. 3 and 4, the oil provided to the interior of oil screen 3 moves to the upper portion of the cylinder head through oil screen 3. The oil is then provided to each intake and exhaust actuators 27 by passing through intake and exhaust oil control valves 25. The oil is provided and discharged to and from actuator 27 through a camshaft end 29, as shown in FIG. 4.

As apparent from the foregoing, there is an advantage in that an oil supply passage of the cylinder head allows more design freedom by variously setting the oil supplying position through which the oil enters into the oil filter. This simplifies the oil supply passage of the cylinder head, reduces power loss of the oil pump, and decreases oil consumption by minimizing the size and weight of the cylinder head.

What is claimed is:

1. An oil filter for a continuous variable valve timing apparatus in an engine, comprising:
 a mounting part coupled to an engine block for retaining a mounted state of said oil filter to the engine block;
 an oil screen for filtering oil; and
 an adaptor that provides a space between said oil screen and mounting part, wherein the oil enters the space substantially perpendicular to an axis extending between the oil screen and the mounting part;
 wherein said oil screen is configured in a conelike cylinder shape having a center axis that is substantially parallel to an axis extending between said mounting part and said adaptor;
 and wherein said adaptor is formed with a plurality of connecting pillars that are substantially parallel to the axis connecting said mounting part and oil screen, and wherein a screen fixing part is configured for mounting said oil screen thereto, wherein said screen fixing part comprises:
 a middle ring connected to said connecting pillars;
 a plurality of mounting pillars extended from said middle ring, and
 a front ring connected to said mounting pillars.

* * * * *